May 25, 1948.  F. B. BUSCH  2,442,034
PIPE COUPLING
Filed March 6, 1946
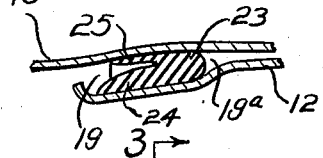
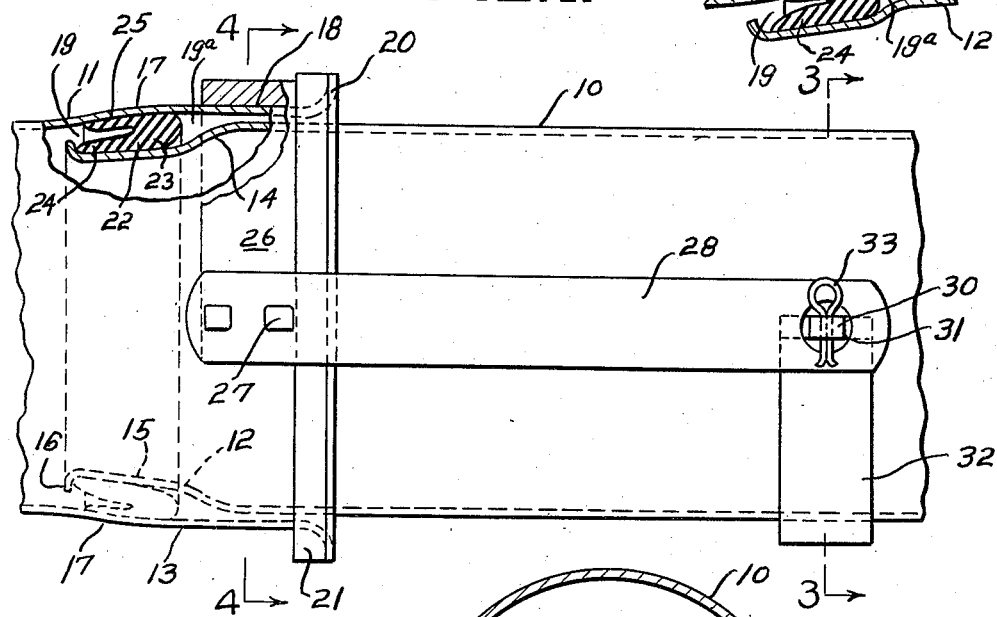
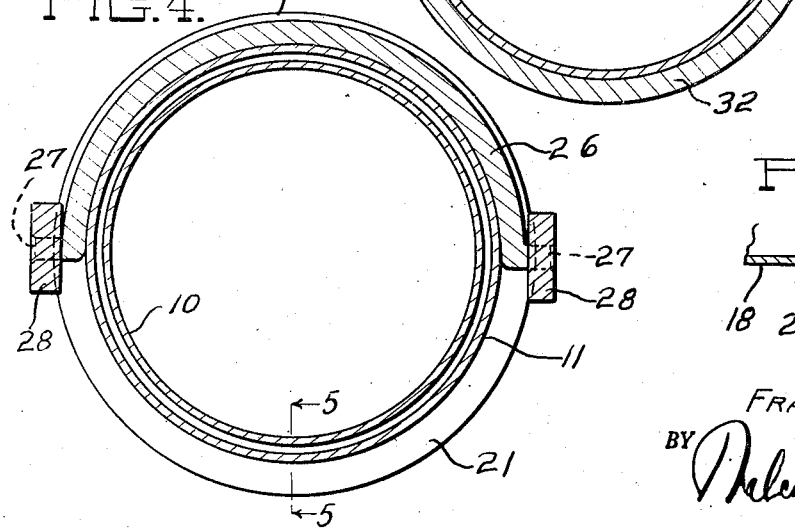
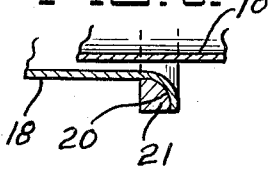
INVENTOR.
FRANK B. BUSCH
BY *Malcolm W. Fraser*
ATTORNEY Patented May 25, 1948

2,442,034

UNITED STATES PATENT OFFICE 2,442,034

PIPE COUPLING

Frank B. Busch, Toledo, Ohio

Application March 6, 1946, Serial No. 652,275

1 Claim. (Cl. 285—163)

This invention relates to pipe couplings or joints and particularly to various improvements in readily connectable or disconnectable pipe sections which are adapted for irrigation purposes. For such purposes, it is a desideratum to provide easily connectable or disconnectable sections of pipe which are light in weight, durable, possess the required flexibility and fluid seal at the joint, and which enable one pipe section to be angled with respect to the adjacent section without detriment to the fluid seal.

It is an object of this invention to produce a new and improved pipe coupling which enables pipe sections to be quickly and easily connected to provide a piping system which may be moved readily from one place to another and over terrain which, not infrequently, necessitates one pipe section to be angularly disposed with respect to adjacent pipe sections.

Another object is to produce a simple and efficient pipe coupling having telescoping end sections with an interposed yieldable sealing gasket which, responsive to the forces of the pressure fluid, deforms or moves sufficiently tightly to grasp the adjacent pipe walls thereby effectively to seal the joint, militating against the leakage of the passing fluid.

A further object is to produce a coupling of the type described, having longitudinally disposed bails interconnecting the telescoped pipe sections to secure the same in the assembled relation in opposition to the the forces resulting from the pressure fluid operating to effect disengagement.

A still further object is to provide formed female and male end sections on thin-walled piping which, in the assembled relation, provides a recess in which a pliable sealing gasket may be disposed, the adjacent pipe walls being convergently tapered in a manner to provide a wedge-like groove, which militates against excessive longitudinal shifting movement of the pliable gasket in response to the operation of the contacting pressure fluid and which movement enhances the sealing properties of the gasket when urged into the wedge-like groove, and an abutment or shoulder being provided for positively limiting axial movement of the sealing gasket when subjected to fluid pressure.

A still further object is to produce a transportable thin-walled light weight pipe section having suitably shaped end portions enabling same to be easily and quickly joined into a continuous system for the conduction of fluid without leakage or loss of flexibility, which is durable and of sufficient strength to resist the heat and pressure ordinarily encountered, and which is adequately protected to prevent deformation or breakage of the telescoping end sections during use.

Other objects and advantages will hereinafter appear, and for purposes of illustration but not of limitation, an embodiment of the invention is shown on the accompanying drawings, in which Figure 1 is a side elevational view partly in longitudinal section of fragments of mating pipe sections coupled together;

Figure 2 is a sectional view of the sealing gasket and a portion of the coupling showing the gasket subjected to fluid pressure;

Figure 3 is a sectional view taken along the line 3—3 of Figure 1;

Figure 4 is a sectional view taken along the line 4—4 of Figure 1; and

Figure 5 is a sectional view taken along the line 5—5 of Figure 4.

The illustrated embodiment of the invention comprises a pair of pipe sections 10 and 11 having metallic walls sufficiently thin to enable the sections to be easily shifted from place to place, and yet of sufficient strength to function safely in the desired application. Each pipe section is of the same diameter except for the telescoping end portions, which constitute one as the male member 12 and another as the female member 13. The male member is curved inwardly at 14, near the end portion, and merges with the end portion 15 which gradually slopes further inwardly to provide a frusto-conical portion which is adapted to be disposed a substantial distance inside of the female member 13. An outwardly curved annular flange 16 integral with the end of the frusto-conical portion defines a groove for retention of the sealing means hereinafter described.

The female member 13 is formed with an outwardly tapered near end portion 17 which merges with another straight longitudinally disposed end portion 18, the walls of which are parallel to the wall of the main pipe sections, thereby to define an opening of larger diameter suitable for insertion of the standard pipe sections therein. The angularity of the tapered portion 17 is substantially the same as the sloping portion 15 of the male member thereby to provide a recess 19 therebetween, which in section is in the shape of a parallelogram. The recess is bound on one end by the curved portion 14 defining a wedge-like section 19a, in cooperation with the straight section 18, and on the other end by the annular flange 16.

An outwardly curved annular flange 20 integral with the end of the female member 13 is reinforced by a metallic ring 21 which is shaped to conform to the curvature of the flange 20 to which it is secured as by welding, brazing or the like. Manifestly, the reinforced flange not only strengthens the pipe sections but also protects the coupling from injury resulting from impacts during handling or the like.

Disposed within the recess 18 is a one-piece molded yieldable rubber-like ring gasket 22, which has a body portion 23 rectangular in cross section from which extends legs 24 and 25 adapted respectively to engage the adjacent walls of the telescoped male and female members. The legs are tapered outwardly from the body portion to form substantially pointed flexible ends, the leg 24 abutting the male member being longer than the other leg.

Secured, as by welding, to the periphery of the female pipe and in abutting relation with the ring member 21 is a semi-circular metal bracket 26 having each end turned outwardly in a manner to form a pair of spaced pins 27. A pair of bail arms 28 with suitable apertures on one end thereof are adapted to be staked to the pins 27, the other end of each bail arm having an aperture 29 for fitting an ear 30 turned out from the reduced end portion 31 of another semicircular metal bracket 32, which is secured, as by welding, to the male pipe section. A cotter key 33 engaging an opening 34 in each ear pivotally secures the latter end of each bail arm to the male member. After the coupling parts have been assembled, the bail is swung to operative position for militating against the parts becoming disengaged.

In operation, the gasket 22 is mounted in the groove in the end portion of the male member, the flange 16 serving to prevent the gasket from slipping off when the pipe sections are disconnected. When the male pipe section is inserted into the female section, the gasket is adapted to abut the adjacent walls of the telescoped members. However, it is not until fluids under pressure are forced through the piping that the gasket is moved more firmly to bear against the walls to provide a liquid seal. As illustrated in Figure 2, the pressure fluids contacting the yieldable gasket cause the spaced legs to be urged outwardly and into intimate contact with the adjacent pipe walls, and concomitantly, axial movement of the gasket, due to deformation, toward the wedge-like section 19, where the body portion itself is firmly grasped, thereby further to improve the liquid seal. It is manifest that the wedge resists excessive shifting movement of the yieldable gasket and insures that it will not be displaced from the desired position which has been chosen to achieve most efficient sealing.

It is manifest that once the gasket has been positioned on to the male member, connection and disconnection may be easily and simply made.

It is to be understood that the described contoured sections may be formed on the ends of sections of elongate pipes by such processes as swaging, or formed coupling elements may be secured to the ends of straight pipe sections by welding, brazing or the like. Other changes in details of construction, arrangement and operation may be effected without departing from the spirit of the invention especially as defined in the appended claim.

What I claim is:

A pipe coupling comprising relatively thin walled telescoping male and female pipe sections, the female section having an outwardly tapered wall spaced from the free end thereof, said tapered wall merging into a substantially straight outer portion of slightly larger diameter than but in substantially parallel relation to the smaller diameter inner portion of the pipe section on the opposite side of said tapered wall, the male section having a wall portion, the diameter of which is substantially the same as the smaller diameter wall portion of the female section, thereby to enable such portion of the male section to fit into the larger diameter outer portion of the female section, a relatively abrupt inwardly tapering wall extending from said last male section wall portion, a relatively gradually inwardly tapering wall extending from said relatively abrupt tapering wall, an outwardly extending flange providing the terminus of said relatively gradual tapering wall, a yieldable rubber-like annular gasket having a relatively thick body portion and divergent relatively thin flexible legs, one side of the body portion of the gasket and one leg engaging said relatively gradual tapering wall of the male section with the free end of such leg adjacent said outwardly extending flange and the other side of the body portion engaging the substantially straight outer portion of the female section, space being afforded in advance of the gasket body to enable the same to shift in response to pressure fluid flowing through the coupling in a longitudinal direction wedgingly between said relatively abrupt wall of the male section and said straight outer portion of the female section, and the other leg of the gasket being engageable with the tapering wall of the female section.

FRANK B. BUSCH.

REFERENCES CITED

The following references are of record in the file of this patent:

UNITED STATES PATENTS

| Number | Name | Date |
| --- | --- | --- |
| 1,985,899 | Jahn | Jan. 1, 1935 |
| 2,049,801 | Gage | Aug. 4, 1936 |

FOREIGN PATENTS

| Number | Country | Date |
| --- | --- | --- |
| 221,567 | Germany | Dec. 3, 1908 |